United States Patent
Midtgaard

(10) Patent No.: US 8,499,896 B2
(45) Date of Patent: Aug. 6, 2013

(54) SYSTEM FOR LIMITING HORIZONTAL MOVEMENTS IN A LIFT

(75) Inventor: Soren Midtgaard, Frederiksberg (DK)

(73) Assignee: AIP APS, Hillerod (DK)

( * ) Notice: Subject to any disclaimer, the term of this patent is extended or adjusted under 35 U.S.C. 154(b) by 335 days.

(21) Appl. No.: 12/920,036

(22) PCT Filed: Mar. 5, 2009

(86) PCT No.: PCT/EP2009/052618
§ 371 (c)(1),
(2), (4) Date: Nov. 23, 2010

(87) PCT Pub. No.: WO2009/109629
PCT Pub. Date: Sep. 11, 2009

(65) Prior Publication Data
US 2011/0067959 A1 Mar. 24, 2011

(30) Foreign Application Priority Data
Mar. 5, 2008 (DK) .................... 2008 00323

(51) Int. Cl.
*B66B 7/02* (2006.01)
*B66B 7/04* (2006.01)
*E04G 1/18* (2006.01)
*E04G 1/22* (2006.01)
*E44G 3/28* (2006.01)

(52) U.S. Cl.
USPC ............ 187/409; 187/407; 182/141; 182/142

(58) Field of Classification Search
USPC ........ 187/407, 409; 182/141, 142, 145; 52/40
See application file for complete search history.

(56) References Cited

U.S. PATENT DOCUMENTS

| | | | | | |
|---|---|---|---|---|---|
| 394,272 | A * | 12/1888 | Hotchkiss | ...................... | 182/141 |
| 536,927 | A * | 4/1895 | Gregory | ........................ | 182/141 |
| 556,961 | A * | 3/1896 | Cleveland | ..................... | 182/141 |
| 748,962 | A * | 1/1904 | Lewis | ............................ | 187/370 |
| 1,392,660 | A * | 10/1921 | Sebestakowicz | ............. | 182/141 |
| 1,931,237 | A * | 10/1933 | O'Connell | ..................... | 187/359 |
| 1,978,273 | A * | 10/1934 | Lundberg et al. | ............. | 187/401 |
| 3,517,775 | A * | 6/1970 | Meyer | ........................... | 187/245 |
| 4,790,410 | A * | 12/1988 | Sharp et al. | ..................... | 182/36 |
| 5,979,599 | A * | 11/1999 | Noles | ............................. | 182/36 |
| 6,056,085 | A * | 5/2000 | Cutter et al. | .................... | 182/36 |
| 6,260,661 | B1 * | 7/2001 | Cutter et al. | .................... | 182/45 |
| 6,998,729 | B1 * | 2/2006 | Wobben | .......................... | 290/54 |
| 2004/0211622 | A1 * | 10/2004 | Renton et al. | ..................... | 182/3 |

FOREIGN PATENT DOCUMENTS

| | | |
|---|---|---|
| AU | 519344 | 7/1979 |
| DE | 1269789 | 6/1968 |
| DE | 1534892 | 3/1970 |
| JP | 04072286 | 3/1992 |
| SU | 674965 | 7/1979 |

* cited by examiner

*Primary Examiner* — William A Rivera
*Assistant Examiner* — Henry Liu
(74) *Attorney, Agent, or Firm* — Fish & Richardson P.C.

(57) ABSTRACT

The invention relates to a system for limiting horizontal movements in a lift for humans or equipment in eg. a wind turbine tower or the like. The lift is to be provided with one or more sliding devices which, during the movement of the lift, guide(s) the lift by cooperating with a cable or the like. The system further includes a securing device for direct or indirect anchoring of the cable to the wind turbine tower. The sliding device and the securing device include tubular units that are adapted to each other to the effect that the tubular unit of the securing device is able to slide within the tubular unit of the sliding device.

11 Claims, 4 Drawing Sheets

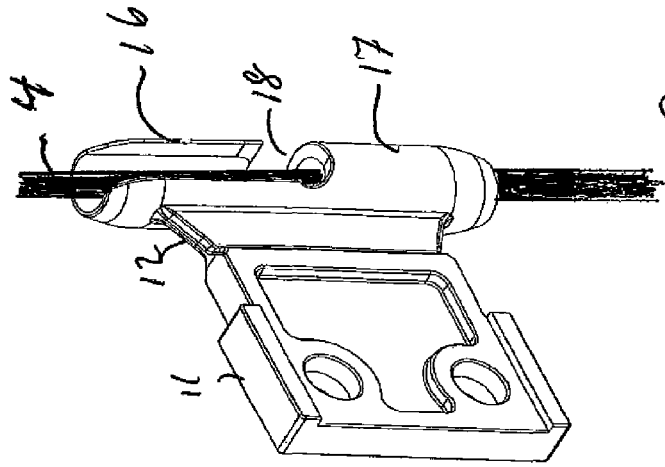
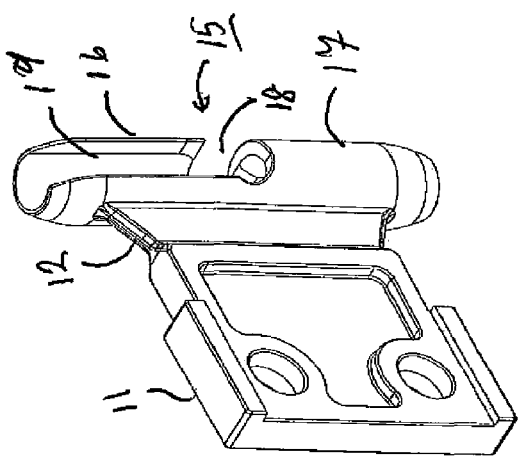
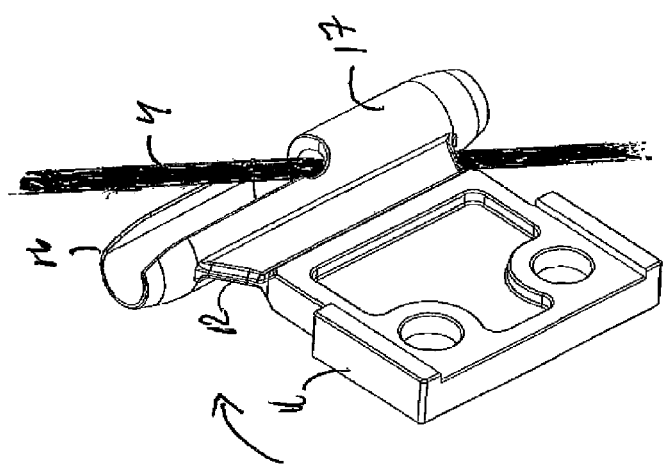
FIG. 5A  FIG. 5B
FIG. 5

SYSTEM FOR LIMITING HORIZONTAL MOVEMENTS IN A LIFT

CROSS REFERENCE TO PRIOR APPLICATIONS

This is a U.S. National Phase application under 35 U.S.C. §371 of International Patent Application No. PCT/EP2009/052618, filed Mar. 5, 2009, and claims the priority of Danish Patent Application No. PA200800323, filed Mar. 5, 2008 both of which are incorporated by reference herein. The International Application published in English on Sep. 11, 2009 as WO 2009/109629 under PCT Article 21(2).

TECHNICAL FIELD

The invention relates to a system for limiting horizontal movements in a lift for humans or equipment in eg a wind turbine tower or the like, where the lift is to be movable between a bottom position and a top position, and wherein the lift is provided with a sliding device mounted thereon, which, during that movement, guides the lift by cooperation with a cable or the like, said system further comprising a securing device for direct or indirect anchoring of the cable to the wind turbine tower, said sliding device and securing device including tubular units that are adapted to each other to the effect that the tubular unit of the securing device is able to slide within the tubular unit of the sliding device, and wherein the tubular of the securing device is arranged on a flange, and the tubular of the sliding device is provided with a slot, wherein flange and slot are also adapted to each other to the effect that the flange is able to pass through the slot when the tubular unit of the securing device travels through the tubular unit of the sliding device.

RELATED PRIOR ART

When work is to be performed at great heights, eg in the context of maintenance of wind turbines, a hoist is often used such that ascent and/or descent are/is performed by means thereof. The hoist may be a so-called ascent-assistance assisting a person using ladders inside the tower of the wind turbine. However, the hoisting mechanism may also comprise an elevator-like structure where a platform or cabin for the transportation of humans and/or equipment is hoisted up or down within the wind turbine tower.

Large complex structures like wind turbines are often provided with landings arranged at various levels with the purpose of allowing a worker to leave the cabin/platform and inspect or repair equipment where intended.

As opposed to other devices where cabins are used, such as eg conventional elevators, the hoisting devices in wind turbines differ in that the cabin/platform does not move inside an actual elevator shaft as such, but is rather controlled by lines/cables that usually extend all the way from the top of the wind turbine to the bottom of the wind turbine.

To secure the lift to those cables, the lifts are provided with sliding devices in which the cables slide during the ascent and descent of the lift.

At the individual levels to be operated by the lift, suitable openings are provided through which the lift may pass, and for safety considerations as well as space considerations, those openings are adapted to the configuration of the cabin of the lift to the effect that the distance between the cabin of the lift and the edge of the individual openings is comparatively small when the cabin travels there through.

In order to further prevent a worker from falling through an opening (when the lift is not at the level in question), the openings are usually encircled by a safety fence. Such safety considerations give rise to a technical problem, since—every contact between lift and permanent fixtures (such as the platforms) causing wear and increased risk of the lift getting stuck—severe requirements are made to the lift not moving in the horizontal plane when passing by the individual platforms or, for that matter, any other equipment arranged thereon.

To solve this problem and to avoid collision between lift and other equipment, securing devices are usually used that secure the guiding cables in such a manner that the cables can essentially not be moved in the horizontal plan, but the lift being, as mentioned above, guided by or sliding on the cable it is, of course, a prerequisite that the securing takes place in such a manner that the sliding devices of the lift are able to pass the securing devices of the cables.

However, it is rarely accomplished that the passages between sliding device and securing device take place without friction, and therefore, often, a certain wear on those parts result. Therefore, in normal operation, one is forced to exchange on or more of such parts from time to time.

According to the prior art, exchange of particularly the securing devices is a cost-intensive task. This is due to the fact that, before those parts can be exchanged, the cable must be dismounted and pulled out of all the securing devices. Following replacement of the parts necessary for the maintenance operation, the cable must again be pulled through all the securing devices, following which the requisite anchoring of the cable at top and/or bottom can be re-established.

It is the object of the invention to provide a system by which it is possible, in a simple and nearly cost-free manner, to replace securing devices without an ensuing need for dismounting the cable. It is also an object of the invention to provide a system that constitutes an alternative to the existing systems.

It is also an object of the invention to provide a system by which it is possible, in an easy and nearly cost-free manner, to replace sliding devices without an ensuing need for dismounting the cable.

It is also an object of the invention to provide a system by which is it possible, in an easy and nearly cost-free manner, to replace both securing devices and sliding devices without an ensuring need for dismounting the cable.

The object of the invention is accomplished by a system that provides the characterising features shown in claims 1-3.

Embodiments of the invention are featured in the dependent claims.

It is to be noted in particular that the designation "tubular" also covers shapes such as quadrangular or triangular; and that the outer cross section is of no significance as long as the devices can secure a cable and a lift as described in the application.

LIST OF FIGURES

An embodiment of the invention will be explained in further detail in the following, reference being made to the figures, wherein:

FIG. 5 shows, in perspective view, an embodiment of a securing device;

FIG. 5a shows, in perspective view, how a cable is mounted in the securing device;

FIG. 5b shows, in perspective view, a cable mounted in a securing device;

Figure 2:
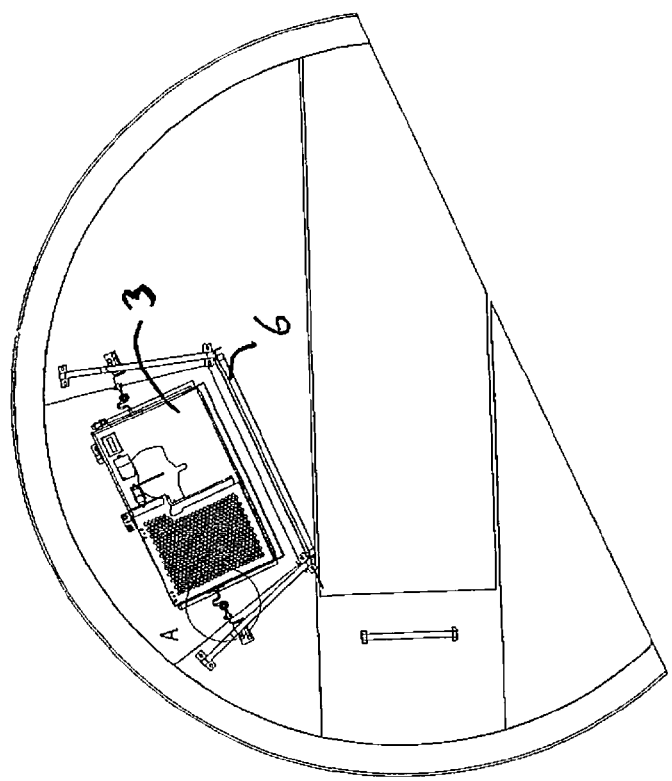
FIG. 2 shows the same section of the wind turbine tower, seen from above.
Figure 1:
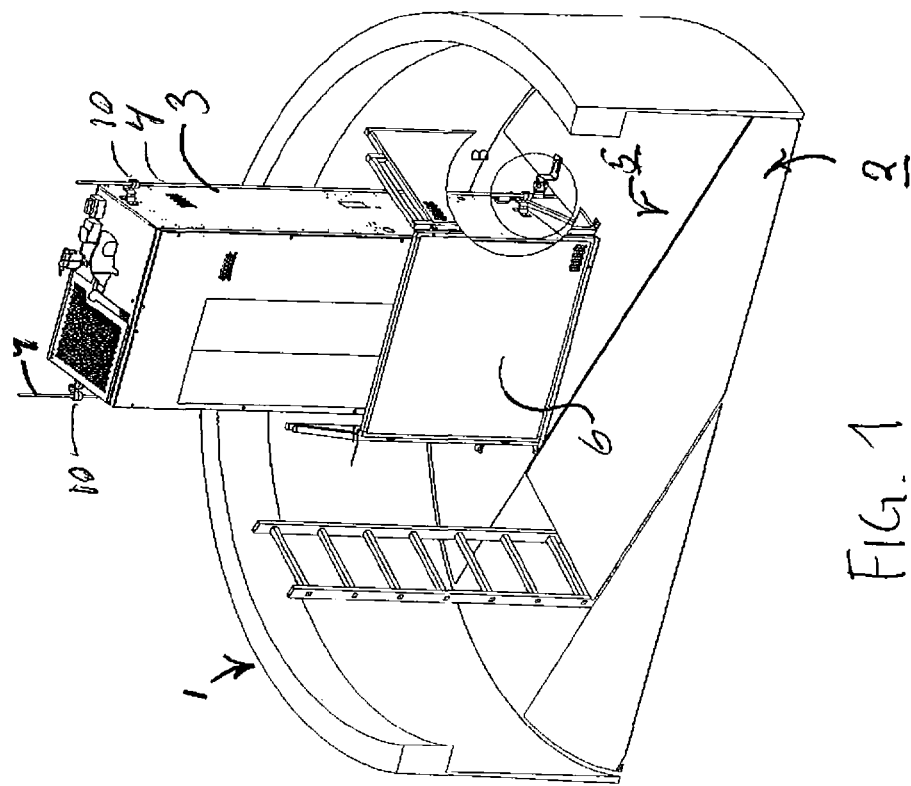
FIG. 1 shows a section of a wind turbine tower in a perspective view.

FIG. 1 shows, in schematic and perspective view, the interior of a wind turbine tower 1. Within the wind turbine tower, a plateau 2 is arranged in which an opening is established through which a lift 3 travels. When work is to be performed at great heights, eg in case of maintenance of wind turbine towers as shown in FIG. 1, a lift 3 is often used to the effect that ascent and/or descent is performed by means thereof.

Typically, the lift is configured as a hoisting mechanism that comprises an elevator-like structure where a platform or a cabin for the transportation of humans and/or equipment is hoisted up or down inside the wind turbine tower.

In large and complex structures such as wind turbines, much equipment is involved and therefore the towers of the wind turbines are often provided with one or more internal plateaus 5 or levels on which a person may be. In broad outline, it corresponds to entirely conventional elevator structures, but often there is a considerable difference between the hoist of a wind turbine and an elevator in a building such as a house; viz that, usually, the space interiorly of a wind turbine does not allow the construction of actual elevator shafts. As opposed to other devices where cabins are used, the hoisting devices in wind turbines therefore differ in that the horizontal movements of the cabin/platform are controlled by lines/cables 4 that usually extend all the way from the top of the wind turbine to the bottom of the wind turbine. To secure the lift to such cables, the lift is provided with sliding devices in which the cables slide during the ascent and/or descent of the lift. Such sliding device 10 is outlined uppermost on the lift 3 in FIG. 1, but will appear in further detail from FIG. 4.

A more detailed discussion of a sliding device according to an embodiment of the invention will be made at a later stage.

The openings in the individual levels through which the lift 3 is to travel are, for safety considerations as well as space considerations, adapted to the shape of the cabin lift to the effect that the distance between cabin of the lift and the edge of the individual openings is comparatively small when the cabin travels there through. To further prevent that a worker may fall through an opening (when the lift is not at the level in question), the openings are usually encircled by a safety fence 6. Such safety considerations give rise to a technical problem, since—any contact between lift and permanent fixtures (such as the platforms) causing wear and an increased risk of the lift getting stuck—severe requirements are made to the lift not moving in the horizontal plane when passing by the individual platforms. To solve this problem, securing devices 11 are usually employed that secure the guiding cables 4 in such a manner that, essentially, the cables cannot be moved in the horizontal plane and thereby collisions are also prevented between the lift and the edges of the opening and/or the fence 6.

Figure 4:
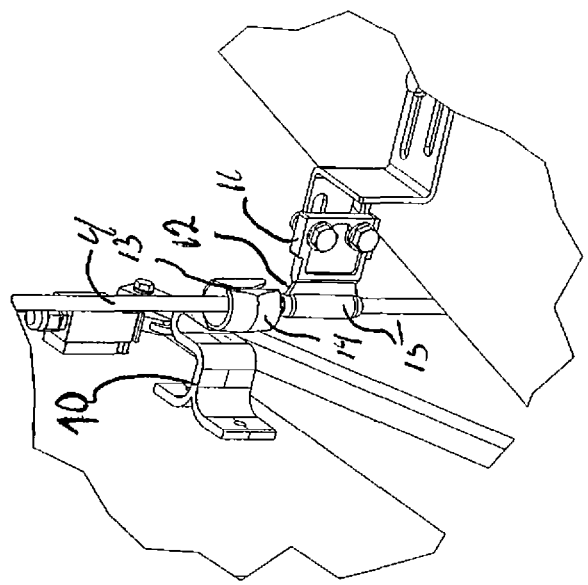
FIG. 4 shows section B shown in FIG. 1.
Figure 3:
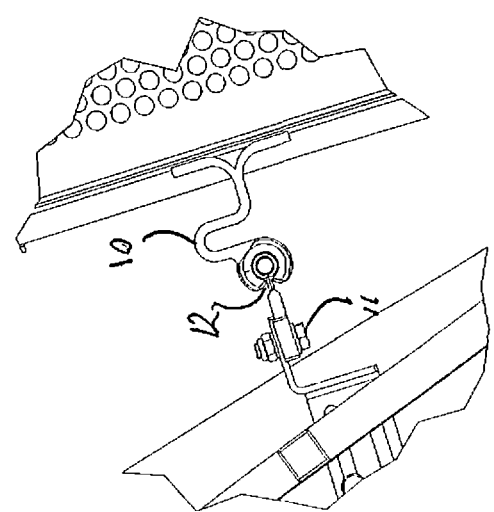
FIG. 3 shows section A shown in FIG. 2.

In the example depicted in FIG. 4 of a securing device 11, the cable 4 is, by means of the securing device 11, secured to the floor as such of the internal plateau.

The lift 3 being, as mentioned above, guided by or sliding on the cables 4, it is of course required that the securing takes place in such a manner that the sliding devices 10 of the lift are able to travel by the securing devices 11 of the cables without them colliding in a destructive manner. This is accomplished in that the securing device 11 and the sliding device 10 are configured complementarily to the effect that the one is able to pass through the other.

As will appear from the embodiment shown in FIG. 4, this can be accomplished by configuring the sliding device with a tubular part 14 which may secure and slide on a cable 4. In this tubular 14 a slot 13 is configured, as also shown in the figure.

In the system shown in FIG. 4, the securing device 11 is also configured with a tubular part 15 that secures the cable 4. Usually the securing device 11 is not configured with a view to the cable being able to slide within the tubular part 15, but, of course, nothing prevents the system according to the invention from comprising securing devices, too, that were made for that purpose.

In order for the sliding unit to be able to pass by the securing unit, the securing unit 11 is configured with a flange 12 that matches the slot 13 to the effect that the flange 12 is able to pass through the slit 13. By simultaneously configuring the tubular part of the securing device 11 to the tubular part 14 of the sliding device it is accomplished that the tubular part 15 of the securing device 11 is able to travel through the tubular part 14 of the sliding device 10 when both are in engagement with the cable 4. In order for the cable not to disengage from the sliding device 10, the slot 13 is usually configured with a smaller cross-sectional area than the diameter of the cable 4.

As will appear from FIGS. 4 and 5, there is a risk that the parts 10 and 11 collide, which, as it is, occurs in normal operation, and for that reason, among others, there is a need for exchanging those parts. This is usually associated with major drawbacks, the cables 4 not being removable or insertable in either sliding device or securing device without the entire cable being pulled out through those units. For practical uses, this means that, in case of such entirely normal maintenance tasks, one has to dismount the cable and then, from the one end, pull it through one or more securing and/or sliding devices. This is expensive and very time-consuming.

FIGS. 5, 5a, and 5b show an embodiment of a securing unit according to the invention. As will appear from the figure, the tubular part 15 is configured with two essentially similar tubular parts 16 and 17 between which an essentially transversely extending cut 18 is provided. The tubular parts 17, 16 are both configured with a cut 19 which, in the shown depictions, are visible only in the upper part of the tubular part 15. Those cuts 19 and the transversally extending cut 18 are configured such that the cable 4 with which the securing unit is intended to be used can be mounted in the securing device 11 as outlined in FIGS. 5a and 5b, viz by first "angling" the securing device as outlined in FIG. 5a and then inserting the cable 4 in the opening 18, following which the securing unit 11 is arranged in its in-use position where the cable 4 essentially follows the essentially common, longitudinally extending axis of the tubular parts 16, 17. Albeit outlined in the figures that the unit 11 is to be angled, it is, of course, also an option to mount the cable in the unit 11 by bending the cable. According to a preferred embodiment, the cut 18 and the cable 4 are adapted to each other to the effect that the cable has a slightly larger diameter than the cross-section of the opening as such. This accomplishes on the one that the cable is to be "clicked" into engagement with the securing unit and, on the other, that the cable does not slide so easily out of engagement there with. According to a preferred embodiment, the cut is configured with a cross-section of 10.5 mm and the cable with a diameter of 12 mm. The internal diameter as such (where the cable travels) is preferably configured with a diameter of 12.5 mm. The two parts 17 and 16 are preferably configured as essentially similar units, but it will be entirely obvious to the person skilled in the art to allow small variations.

Figure 6:
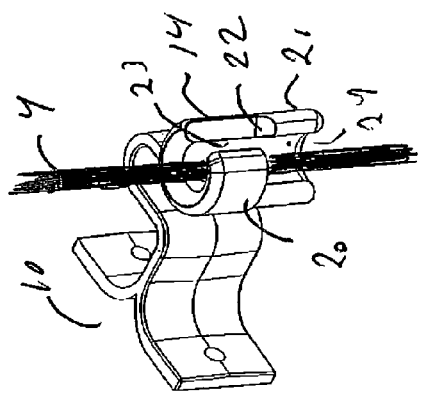
FIG. 6 shows, in perspective view, an embodiment of a sliding device.
Figure 6A:
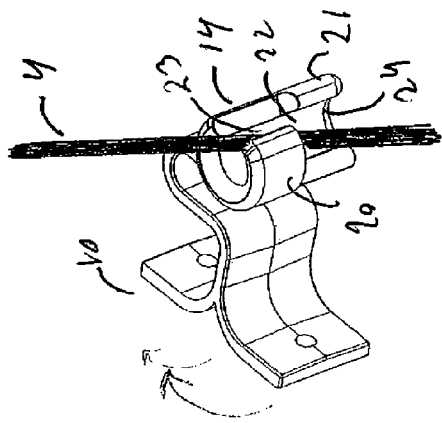
FIG. 6a shows, in perspective view, how a cable is mounted in a sliding device.
Figure 6B:
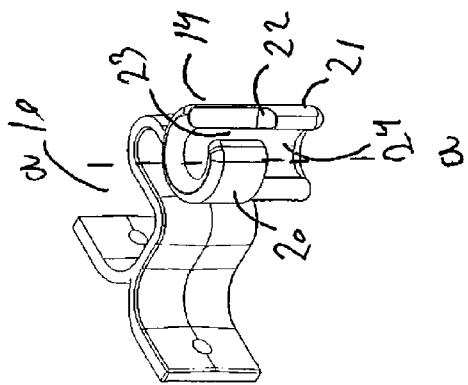
FIG. 6b shows, in perspective view, a cable mounted in a sliding device.

FIGS. 6, 6a, and 6b show an embodiment of a sliding unit 10 according to the invention. As will appear from the figure, the tubular part 14 is configured with two essentially similar tubular parts 20 and 21. Between parts 20, 21 there is, like in the securing unit explained above, configured an essentially transversally extending opening 22. The tubular parts 20, 21 are, similarly to the securing unit 11, also both configured with a cut 23, 24, but, as opposed to the securing unit 11, the sliding unit makes a functional requirement that the cuts are to extend in such a manner that they complement each other to the effect that they form a slot which is adapted such that the flange 12 on the securing device 11 is able to pass through the slot when the system is used in a manner that corresponds to the one of the system shown in FIG. 4.

Cuts 23, 24 and the transversally extending opening 22 are configured such that the cable 4 with which the sliding unit 10 is intended to be used can be mounted in the sliding unit 10 as outlined in FIGS. 6a and 6b, viz by first "angling" the sliding unit 10 as outlined in FIG. 6a and then inserting the cable 4 into the openings 22, 23, 18, following which the sliding unit 10 is arranged in its in-use position, where the cable 4 essentially follows the longitudinally extending axis of the tubular parts 22, 23. Albeit outlined in the figures that the unit 10 is to be angled, it is, of course, also an option to mount the cable in the unit 10 by bending the cable. The cuts 23, 24 may, like the securing device, be configured slightly smaller in the sliding unit compared to the diameter of the cable 4, meaning that the cable is to be "clicked" into engagement.

Albeit securing unit and sliding unit are described as components in a system, they may also be independent units that may individually partake in other technical contexts.

The invention claimed is:

1. A system for limiting horizontal movements in a lift for humans or equipment in a wind turbine tower where the lift is movable between a lower position and an upper position comprising
   a sliding device for mounting on the lift for guiding the lift during upwards and downwards movement by cooperating with a cable;
   a securing device for direct or indirect anchoring of the cable to the wind turbine tower, said sliding device and a securing device including tubular units that are adapted to each other to enable the tubular unit of the securing device to slide within the tubular unit of the sliding device, and
   wherein the tubular unit of the securing device is arranged on a flange, and the tubular unit of the sliding device is provided with a slot, the flange and slot configured to enable the flange to travel through the slot when the tubular unit of the securing device travels through the tubular unit of the sliding device,
   the securing device is configured with two tubular parts having a longitudinally extending axis; and, an essentially transversally extending opening configured between the two tubular parts, which tubular parts also have cuts that together with the transversally extending opening, are configured to enable a cable to be mounted in the securing unit by first inserting the cable into the transversally extending opening and subsequently turning the securing device to permit the cable to follows the longitudinally extending axis of the tubular parts.

2. A system for limiting horizontal movements in a lift for humans or equipment in a wind turbine tower, where the lift is to be movable between a lower position and an upper position, said system comprising: a sliding device for mounting on the lift
   that guides the lift by cooperating with a cable
   a securing device for direct or indirect anchoring of the cable to the wind turbine tower, said sliding device and securing device including tubular units that are adapted to each other to enable the tubular unit of the securing device to slide within the tubular unit of the sliding device, and wherein the tubular part of the securing device is arranged on a flange, and the tubular part of the sliding device is provided with a slot, the flange and the slot are also adapted to each other to enable the flange to travel through the slot when the tubular unit of the securing device travels through the tubular unit of the sliding device, wherein the system includes a sliding device which is configured with two tubular parts having a longitudinally extending axis; and that, between those parts, an essentially transversally extending opening is configured, tubular parts are both configured with cuts that extend such that they complement each other and the cuts combine to form a slot in which the flange on the securing device is able to travel through the slot; and the cuts and the transversally extending opening are configured such that a cable with which the securing unit is intended to be used can be mounted in the sliding device by first inserting the cable into the transversally extending opening and subsequently turning the securing unit such that, essentially, the cable follows the longitudinally extending axis of the tubular parts.

3. A system according to claim 1, wherein the system includes a securing unit according to claim 1 and a sliding unit.

4. A system according to claim 1, wherein the securing unit is configured from plastics.

5. A system according to claim 2, wherein the sliding unit is configured from plastics.

6. A system according to claim 2, wherein the tubular units of the securing unit complement each other such that the cable cannot be pulled out of engagement with the securing device when the cable extends in the same direction as that of the longitudinally extending axis of the tubular units.

7. A system according to claim 2, wherein the system includes a securing unit according to claim 1 and a sliding unit.

8. A system according to claim 3, wherein the securing unit is configured from plastics.

9. A system according to claim 3, wherein the sliding unit is configured from plastics.

10. A system according to claim 3, wherein the tubular units of the securing unit complement each other in such a manner that the cable cannot be pulled out of engagement with the securing device when the cable extends in the same direction as that of the longitudinally extending axis of the tubular units.

11. A system according to claim 5, wherein the tubular units of the securing unit complement each other and the cable cannot be pulled out of engagement with the securing device when the cable extends in the same direction as that of the longitudinally extending axis of the tubular units.

* * * * *